July 2, 1935.  E. F. G. GIBBS  2,006,801

BALL BEARING CENTER

Filed Jan. 26, 1932

INVENTOR
Edward F. G. Gibbs

Patented July 2, 1935

2,006,801

UNITED STATES PATENT OFFICE 2,006,801

BALL BEARING CENTER

Edward F. G. Gibbs, Detroit, Mich.

Application January 26, 1932, Serial No. 588,888

4 Claims. (Cl. 82—33)

This invention relates to new and useful improvements in live centers and spindles used mostly in the tail-stock of the ordinary engine lathe and similar tool machines. I do not mean to limit myself, however, in any sense, except as required by the scope of the claims.

The objects sought here, under the extremely exacting conditions is to develop a center with ample strength, yet resilient, accuracy and rotatory ease; and having the shortest possible over-hang; smallest head; a housing with oil-room, and oil-proof joints: briefly speaking, a center in which efficiency is increased and cost reduced by the fewness of the parts employed.

I attain these objects by the construction hereinafter described, shown in the accompanying drawing, which forms a part of this specification, and specifically defined in the appended claims.

Figure 2:
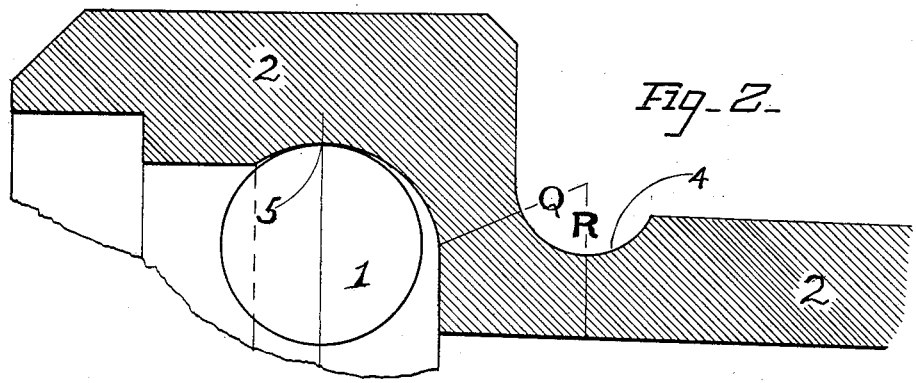
Figure 1:
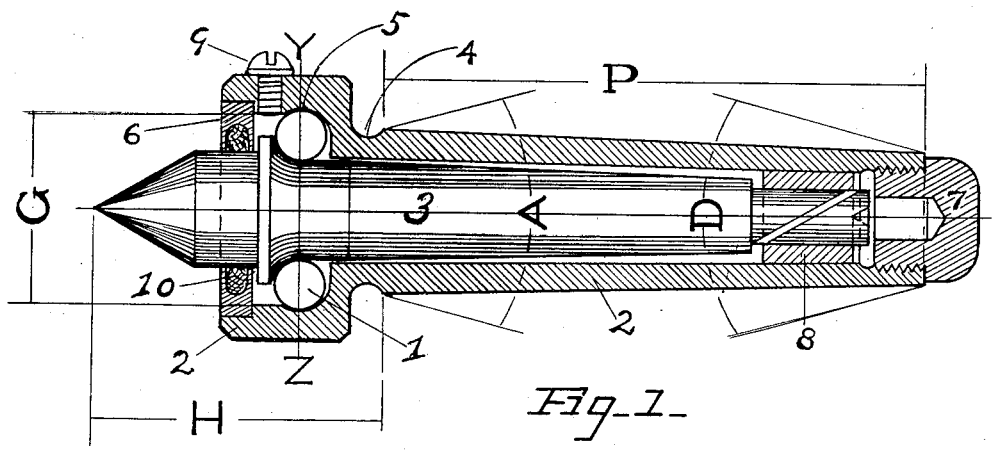

Referring to the drawing by figures, Fig. 1 is a plan view of the center complete, showing a central sectional view of the housing member, front end retainer, packing therein, rear end retainer, and rear end spindle-bearing. It also exposes the cone-pointed spindle, bearing balls, and oil hole stopper. While Fig. 2 is an enlarged sectional view of a segment of the housing head and one bearing ball in working relation to each other.

Reference being had now to the various elements of the subject by numerals, in which similar digits refer to similar parts throughout.

Digit 1 designates the bearing balls or roller-bearings; 2 the housing member, both head and bearing shank; 3 the cone pointed rotating spindle; 4 the under-cut fillet, which connects the housing head and shank; 6 the friction-bound front end retainer; 7 the thread-bound rear end retainer; 8 the rear end spindle bearing; 9 the oil-hole stopper; 10 the felt packing.

The straight line Y—Z is the bearing line on which each ball has 2 bearings, when the spindle fits snugly, without shake and is at rest. Letters D, A and P represent bearing shank dimensions, the reading of which (understood) indicates the taper-name and number: thus "Morse No. 4." The G measurement indicates the mean I D of the housing head or ball-cup; and H the over-hang of the center, as a unit: while Q and R indicate the 2 lines of deflection in the head, when the center is under thrust and radial strains respectively.

One conspicuous feature here is the absence of elements generally employed. But the functions required of the missing elements are made inherent in those retained. Nothing is lost.

We have here a ball bearing center, with only one set of balls 1, to resist both thrust and radial strains; and they are both raceless and cageless. Being raceless reduces both the diameter and length of the housing-head 2, and being cageless enables the use of 50% more balls which relieves the concentration of ball pressure on the spindle 3, where convex bearing surfaces meet.

The chromium steel ball is the ideal roller bearing for a live center, because of its diminutive size, rotational ease and its great resilient strength. But it is most sensitive to sharp concussion. To illustrate—A good ⅜" steel ball has 12.600 pounds' crushing resistance; and yet, on an anvil, much less than a 12 pound direct hammer blow will open it; a ratio of more than 1000 to 1.

Hence we discard foreign springs and pads, which can get lost, and under-cut the fillet 4 which connects the head 2, and bearing shank, also 2. From this we get deflection on 2 lines, Q and R, shown in Fig. 2. Thus when a shaft under operation, elongates from heat, the fillet springs on line Q like the bottom of an oil squirt can; and when under radial strain from the cutting tool, it springs on line R.

A very fortunate union exists between the friction-bound retainer in the front end, and the thread-bound retainer in the rear end; because external means can always be found to press the former retainer into the mouth of the ball-cup, but it would be very inconvenient to get it out, without the aid of the threads of the rear end retainer. Furthermore, a properly made retainer, pressed into a ground ball-cup is more solid and accurate, and its porthole fits the spindle end concentrically which projects through it.

Wear in the rear spindle bearing 8, which is tapered on the outside, may be taken up by driving it downward, using the spindle for a plunger.

Three oil holes, 120 degrees apart, and closed by oil-proof stoppers 9, tend to distribute the wear in the bore of the rear spindle bearing 8.

A felt packing 10, is necessary to keep the oil in, and dirt and water out of the housing.

Having thus described my invention, I submit the following—

1. A ball bearing center comprising a housing member, having a head at the front and a bearing shank extending rearwardly, the two being connected by an undercut fillet which permits the head to spring under strain, bearing balls in the said head, a bearing member in the rear end of the said shank, a rotatable center spindle supported by the said balls in the head and the bearing member in the rear, front and rear end retainers and means for receiving and retaining oil, all substantially as set forth.

2. A ball bearing center comprising a housing member, having a head at the front and a bearing shank extending rearwardly, the two being connected by an undercut fillet which permits the head to spring under strain, bearing balls in the said head, a bearing member in the rear end of the said shank, a rotatable center spindle supported by the said balls in the head and the bearing member in the rear, a friction-bound retainer in the front end, a thread-bound retainer in the rear end and means for receiving and retaining oil, all substantially as set forth.

3. A ball bearing center of the character described comprising a housing member having a head at the front and a bearing shank extending rearwardly, bearing balls within the said head, a bearing member at the rear end of the said shank, a rotatable center spindle supported by the said balls in the head and the bearing member in the rear, a friction-bound retainer in the front end a thread-bound retainer in the rear, and means for receiving and retaining oil, all substantially as set forth.

4. A roller bearing center of the character described comprising a housing member having a head at the front and a bearing shank extending rearwardly, bearing rollers within the said head, a bearing member at the rear end of the said shank, a rotatable center spindle supported by the said rollers in the head and bearing member in the rear, a friction-bound retainer in the front end and a thread-bound retainer in the rear, and means for receiving and retaining oil, all substantially as set forth.

EDWARD F. G. GIBBS.